Sept. 4, 1951 R. R. ENGLISH 2,566,762

REACTANCE TUBE CONTROL FOR SAWTOOTH GENERATORS

Filed April 26, 1946 2 Sheets-Sheet 1

INVENTOR.
ROBERT R. ENGLISH
BY Mueller and Mason
ATTORNEYS

Sept. 4, 1951 R. R. ENGLISH 2,566,762

REACTANCE TUBE CONTROL FOR SAWTOOTH GENERATORS

Filed April 26, 1946 2 Sheets-Sheet 2

INVENTOR
ROBERT R. ENGLISH
BY
Mueller and Mason
ATTORNEYS

Patented Sept. 4, 1951

2,566,762

UNITED STATES PATENT OFFICE 2,566,762

REACTANCE TUBE CONTROL FOR SAW-TOOTH GENERATORS

Robert R. English, Chicago, Ill., assignor to Motorola, Inc., a corporation of Illinois Application April 26, 1946, Serial No. 665,104

8 Claims. (Cl. 250—36)

This invention relates generally to frequency control systems and in particular to a system for controlling the frequency of a sawtooth scanning generator used in a television receiving system.

For the purpose of deflecting the scanning beam in television receiving equipment so that the beam traverses the screen in a predetermined manner, magnetic deflecting coils are used in combination with a generator provided for producing currents in the coils having a sawtooth wave form. For deflecting the beam horizontally across the screen the current in the deflecting coils must build up linearly causing the beam to move across the screen at a constant rate and then drop very suddenly causing the beam to be returned very fast in what is generally called the retrace period. The generator generally includes a vacuum tube having plate and grid circuits coupled through a transformer which produces a linearly rising current until the tube is saturated at which point the transformer and load oscillate freely causing the current in the load to drop very suddenly. In such a system synchronizing pulses received by the television receiver are applied to an auxiliary grid in the tube to cut off the tube prematurely when a synchronizing pulse is received. This arrangement positively locks the oscillator to the synchronization pulses and has the disadvantage that any irregularity in the pulse rate causes corresponding irregularity in the scanning frequency resulting in distortion or tearing of the picture. Also in such a system, the speed of the free oscillation at the end of each sawtooth wave depends upon the effective inductance of the transformer coils and the deflecting windings. This oscillation controls the retrace time and it is desirable that this time be held to a minimum. As the inductance of the windings is normally high, the speed of the free oscillation is not as fast as sometimes desirable.

It is an object of this invention, therefore, to provide means for keeping the frequency of a sawtooth oscillator in step with synchronizing pulses without positively locking the oscillator to the pulses.

It is another object of this invention to provide a control system for a sawtooth generator which controls the frequency of the generator in accordance with the average frequency of a pulse voltage.

It is a further object of this invention to provide means for effectively reducing the inductance of the transformer of a sawtooth generator to make the retrace or flyback of the sawtooth wave as sharp as possible.

In accordance with one feature of this invention, there is provided a control system for holding a sawtooth oscillator in step with synchronizing pulses which includes means for comparing the frequency of the oscillator with the frequency of the pulses and for producing a voltage varying in accordance with the deviation of said oscillator frequency which is utilized to vary the reactive impedance of the oscillator circuit to eliminate the deviation in frequency.

A further feature of this invention resides in the use of a reactance tube to vary the effective reactance of the transformer of a sawtooth generator, thereby to vary the frequency of the generator.

Still another feature of this invention resides in the provision of an integrating circuit for producing a voltage which varies in accordance with the deviation of the oscillator frequency from the synchronization pulse frequency and for applying this voltage to a reactance tube to so control the frequency of the oscillator that the average frequency of the oscillator over a short period of time is equal to the average frequency of the synchronization pulses over the corresponding period.

A still further feature of this invention pertains to the use of a reactance tube to vary the reactance of the output circuit of a sawtooth generator which is connected to the deflecting coils of a television receiver in the proper sense to reduce the reactance of the circuit and thus reduce the retrace time.

Further objects, features and advantages of the invention will become apparent from a consideration of the following description taken in connection with the accompanying drawings in which.

In practicing the present invention there is provided a television receiving system including a synchronization signal separator for providing horizontal synchronizing pulses for control of a sawtooth generator which furnishes current for the deflection coils of a cathode ray tube in order magnetically to deflect the cathode ray thereof. The sawtooth generator includes a vacuum tube having plate and grid circuits coupled through a transformer to provide a sawtooth current output. A discriminator is provided for comparing the frequency oscillation of the generator with the synchronizing pulses and thus provide a resultant voltage varying in accordance with the deviation of the generator frequency from the synchronization pulse frequency. This voltage is used to control a reactance tube which is connected in parallel with the transformer to vary the effective reactance thereof, thereby to maintain correspondence between the generator frequency and the synchronization pulse frequency. Facilities are also provided for so controlling the bias of the reactance tube that this tube is also effective to vary the reactance of the transformer in the proper sense to reduce the retrace deflection time of the cathode ray.

Figure 1:
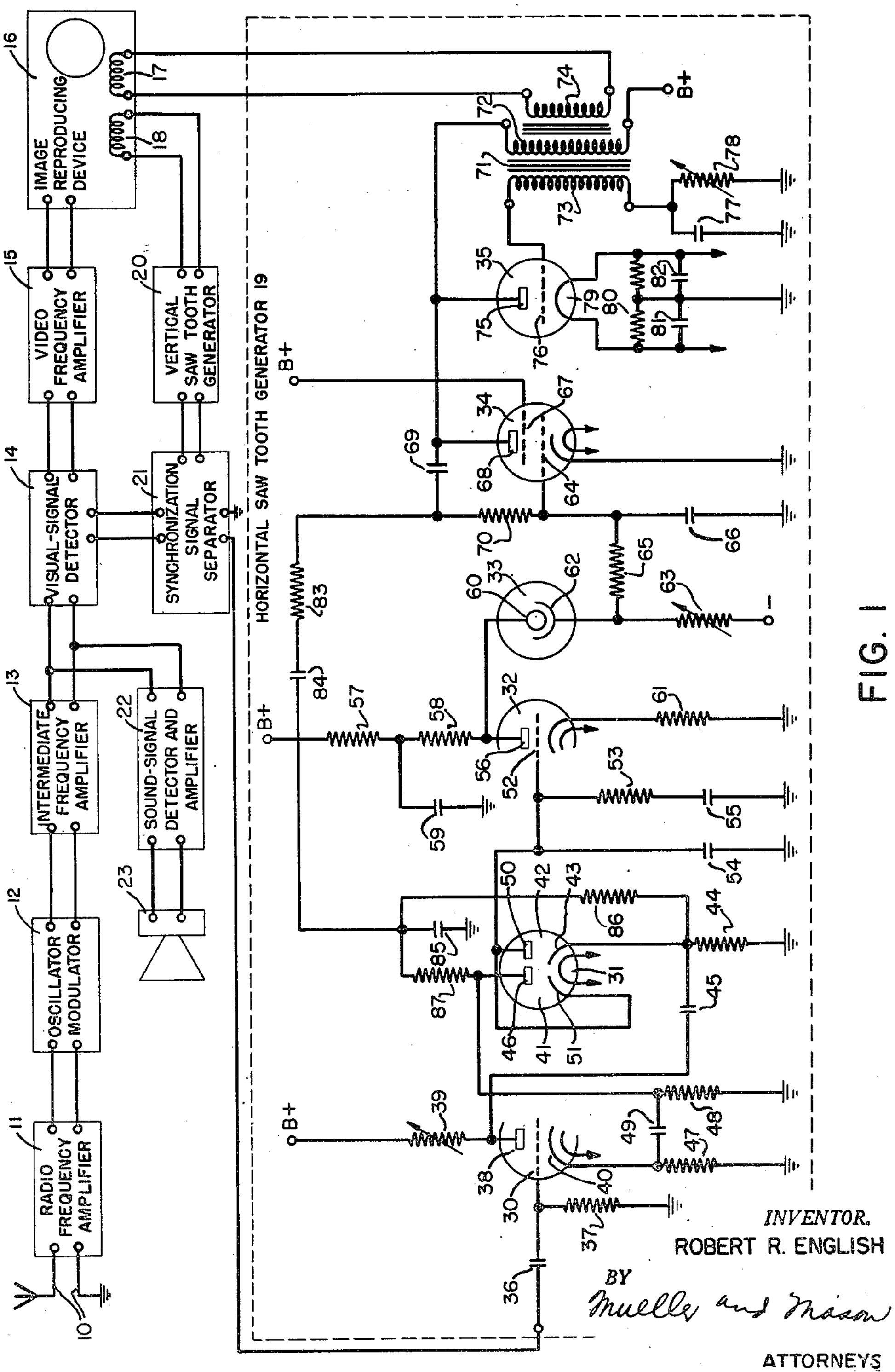
Fig. 1 is a circuit diagram of a television receiver system utilizing a horizontal sawtooth generator and control system characterized by the features of the present invention.

Referring now to the drawings, in Fig. 1 is illustrated a television receiver of the superheterodyne type and the circuit diagram of the control system in accordance with the invention for controlling the horizontal scanning generator of the television receiver. Incoming signals are picked up by an antenna-ground circuit 10 and the signals of the desired frequency are selected and amplified in the tunable radio frequency amplifier 11. The signals are then converted into intermediate frequency form by an oscillator-modulator 12 and are further selected and amplified in an intermediate frequency amplifier 13. The picture signal is then derived in a visual signal detector 14 and is amplified in the video frequency amplifier 15 for application to the control electrode of the image reproducing device 16. For the purpose of deflecting the image producing beam of the device 16, deflecting coils 17 and 18 are provided in this device which are supplied with current of sawtooth wave form by horizontal and vertical sawtooth generators 19 and 20, respectively. The synchronizing signals are separated and amplified in the synchronization signal separator 21 and are applied to both the horizontal sawtooth generator 19 and the vertical sawtooth generator 20. Sound modulated signals derived from the intermediate frequency amplifier 13 are detected and amplified in a sound signal detector and amplifier unit 22 and are reproduced by a sound reproducing device 23. All of the units described with the exception of the horizontal sawtooth generator 19 may be of well known construction and accordingly are not illustrated and described in detail. The operation of the sawtooth generator 19 will be described in detail below.

Referring now more particularly to the portion of the system embodying the present invention, the horizontal sawtooth generator and control system therefor includes the following stages coupled in cascade in the order named; a phase splitter comprising a triode 30, a rectifier tube 31 which includes two diode sections, a direct current amplifier including a triode 32, a voltage regulator comprising a gas filled tube 33, a reactance control tube 34 and an oscillator comprising a triode 35. The triodes 30 and 32 may be combined in a single tube as is illustrated. The horizontal synchronization pulses are applied to the grid of triode 30 through a coupling condenser 36. For providing the proper input and output electrode operating potentials for the triode 30, the grid is connected through a resistor 37 to ground and the plate 38 is connected to a source of B+ potential through a variable resistor 39. The output electrodes 38 and 40 of the triode 30 are coupled to the diodes 41 and 42 of the tube 31, the plate 38 being coupled to the cathode 43 of diode 42 through a resistance-capacitance network including a resistor 44 and condenser 45, and the cathode 40 being coupled to the plate 46 of the diode 41 through a resistance-capacitance network comprising resistors 47 and 48 and a condenser 49. The plate 50 of diode 42 is connected to the cathode 51 of diode 41 thus bridging the two diodes 41 and 42 in series across the output electrodes of the tube 30.

The common connection between the diodes 41 and 42 is coupled to the grid 52 of the triode 32 through a coupling network composed of a resistor 53 and condensers 54 and 55, the triode 32 amplifying the voltages appearing at the common connection. The plate 56 of triode 32 is connected to the voltage source B+ through a voltage reducing network including resistors 57 and 58 and a by-pass condenser 59, and the cathode of this tube is grounded through a cathode biasing resistor 61. The plate 56 of the amplifier is directly connected to the cathode 60 of the voltage regulator tube 33, the plate 62 of which is connected to a source of negative potential through a variable resistor 63. Thus the voltage regulator 33 and the resistor 63 are connected to form a voltage divider, the voltage on the plate 62 being the difference between the positive voltage at 60 and the negative voltage applied to resistor 63 and always being negative. The plate 62 of the voltage regulator is coupled to the grid 64 of the reactance tube 34 through resistance-capacitance network comprising a resistor 65 and condenser 66.

For providing operating potential for the reactance tube 34, the screen grid 67 thereof is connected to the B+ potential. The plate 68 of the reactance tube is coupled to the grid 64 through a condenser 69 and resistor 70. The reactance tube is utilized to vary the effective reactance of the transformer 71 and is connected across winding 72 thereof. The plate 75 and grid 76 of the oscillator tube 35 are connected to the windings 72 and 73, respectively, of the transformer, the plate 75 being connected to the B+ voltage through the winding 72 and the grid being connected through the winding 73 and the parallel capacitor 77 and variable resistor 78 to ground. The variable resistor 78 and condenser 77 are used to vary the inductance in the grid circuit of the oscillator tube, thereby to change the output frequency of the oscillator. The tertiary winding 74 of the transformer 71 is connected to the deflecting coil 17 of the image reproducing device for providing a sawtooth current in this coil. For the purpose of grounding the center point of the cathode 79 of the oscillator tube 35, a voltage divider network including a center tapped resistor 80 and condensers 81 and 82 are connected between the two terminals of the cathode and ground.

In order to provide a voltage across the bridge circuit comprising diodes 41 and 42 which is of the same frequency as the oscillator output frequency, means are provided for coupling the cathode 43 of the diode 42 and the plate 46 of the diode 41 to the plate 75 of the oscillator tube 35. This coupling means includes a condenser 69, resistor 83, condenser 84, condenser 85, resistor 86 and resistor 87. The resistor 83 and condenser 85 constitute an integrating circuit which form a sawtooth voltage across the condenser which is applied to the cathode 43 and plate 46 of the diodes through resistors 86 and 87 respectively.

The operation of the horizontal sawtooth generator will now be described. The oscillator itself, including tube 35 and associated circuits, is in general use and the operation thereof is well known. In order that the sawtooth current in the horizontal deflecting coils 17 is in synchronism with the horizontal synchronizing pulses, a circuit for comparing the frequency of the oscillator with the frequency of the synchronization pulses is provided which produces a voltage later used to correct the frequency of the oscillator. Horizontal synchronization pulses are received from the synchronization signal separator 21 and applied to the grid of tube 30. The tube 30 functions as a phase splitter providing a positive pulse on the plate 38 and a negative pulse on the cathode 40, the two outputs being of opposite phases and equal amplitude. These two outputs are applied across the diodes 41 and 42 which are connected in series and form a bridge circuit or discriminator. The positive pulse from the plate of tube 30 is applied to the cathode 43 of diode 42 with the series circuit continuing from the plate 50 of diode 42 to the cathode 51 of diode 41 and to the plate 46 which receives the negative pulse from the cathode 40 of tube 30. The sawtooth current from the oscillator is also applied across the series diodes, being connected from the plate 75 of the oscillator 35 through a series of condensers and resistors as previously described. Resistor 83 and condenser 85 constitute an integrating circuit which produces a sawtooth voltage across the condenser 85 from the pulse voltage on the plate of the oscillator. This voltage is applied through resistors 86 and 87 across the series connected diodes. Accordingly, the sawtooth voltage of the oscillator is superimposed on the pulse voltages derived from the synchronization pulse in the bridge circuit and if the oscillator tends to run slow, more current will flow in the negative diode 41 and less in the positive diode 42 reducing the potential of the common connection between the two diodes. If the oscillator runs fast, the opposite will take place. The manner in which the voltages are mixed in the brdge circuit and the resulting potential at the common connection between the diodes is illustrated in the charts shown in Figs. 2 and 3.

The potential of the center point between the diodes is applied to the grid 52 of the triode 32 which operates as a D. C. amplifier to provide varying D. C. voltages in the output circuit which are proportional to the shift of the oscillator output frequency from the synchronization pulse frequency. The voltage from the amplifier is applied to a voltage regulator 33 which provides negative voltages from the positive voltages from the plate of tube 32 for use in controlling the reactance tube 34. The voltage regulator is connected to a source of negative potential which is greater (negative) than the maximum voltage to be obtained from tube 32 so that a negative potential is always available for operation of the reactance tube. The voltage from tube 32 is combined directly with the negative potential so that if the voltage from the tube is 100 volts and the negative potential applied to the voltage regulator is 150 volts, a negative voltage of 50 volts will be produced for operation of the reactance tube 34. The amount of voltage applied to the voltage regulator may be varied by adjustment of variable resistor 63. In a particular application the desired resistance value will normally be fixed and a variable resistance is not required.

The reactance tube 34 is used to provide a variable reactive impedance across or in shunt with the oscillator circuit. The pulse occurring in the plate circuit of tube 34 (and also the plate 75 of tube 35) is connected to the grid 64 of tube 34 through coupling condenser 69 and resistor 70 in series. Resistor 70 and condenser 66 constitute an integrating circuit forming a sawtooth voltage from the pulse voltage appearing in the plate circuit, which is applied to the grid of the reactance tube. The plate current of the tube 34 is, therefore, in phase with the grid voltage, which is the plate voltage delayed by the integrating circuit, and the reactance tube therefore draws a lagging current through the winding 72 of the transformer 71. This lagging current produces the effect of a shunt reactive impedance and as the grid bias is reduced on tube 34, the impedance of the tube becomes more inductive to thereby reduce the effective inductance of the transformer. Since the speed of the oscillating circuit is proportional to the inductance divided by resistance, the frequency will be increased as the inductance of the reactance tube is decreased.

Accordingly, it is seen that as the oscillator frequency becomes slower than the frequency of the synchronization pulses, the grid voltage on tube 32 is reduced causing an increase in the plate voltage thereof. The increase in plate voltage is translated into a change of the negative bias applied by the voltage regulator 33 to the grid of reactance tube 34 in such a manner that decreasing frequency of the oscillator causes decreasing grid bias on the tube making the tube more reactive and reducing the effective inductance of the transformer thereby increasing the speed of the oscillator to bring the oscillator into synchronism with the horizontal pulses. If the oscillator runs too fast the bias on tube 34 is increased and the effective inductance of the transformer accordingly increased.

Figure 2:
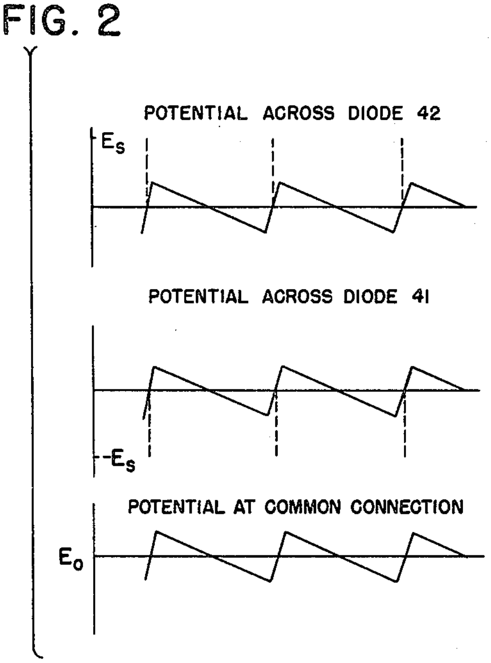
Figs. 2 and 3 are curves showing the manner in which the oscillator frequency and synchronization pulses are combined in the bridge circuit.
Figure 3:
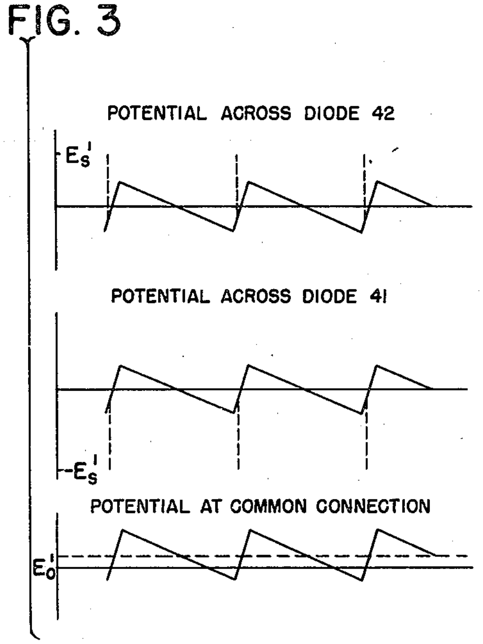

Referring now to Figs. 2 and 3, the manner in which the voltage from the oscillator and the synchronizing pulses are mixed is seen. As previously stated, sawtooth voltages are produced across condenser 85 and applied to the diodes 41 and 42 through resistors 87 and 86. These voltages are shown in Figs. 2 and 3 in solid lines. The tube 30 provides positive and negative pulses of equal magnitude and opposite polarity from the synchronization pulses, the positive pulses Es being applied across diode 42 and the negative pulses −Es being applied across diode 41. These voltages are shown by the dotted lines in Figs. 2 and 3. Fig. 2 illustrates the manner in which the voltages are combined in the diodes when the sawtooth voltage of the oscillator is in step with the synchronization pulses. In this condition, the synchronization pulses appear when the sawtooth voltages cross their axes, which represent the average value of the varying voltages, and will produce an equal and opposite effect in the two diodes. Accordingly, the effect of the synchronization pulses will cancel each other and will not appear at the center connection between the diodes. Therefore, the voltage at the center point will depend only on the sawtooth voltage produced by the oscillator.

In Fig. 3 is shown the potential across the diodes when the frequency of the oscillator is slower than the occurrence of the synchronization pulses. In this case the synchronization pulses will not appear when the sawtooth voltages are crossing their axes but at a short interval before the sawtooth voltages cross their axes. Accordingly, the synchronization voltage across diode 42 will be combined with the negative voltage from the sawtooth wave and the positive voltage Es' appearing across the diode will be less than the amplitude of the synchronization voltages. At the same time the negative synchronization voltage appearing across diode 41 will combine with a negative voltage of the sawtooth wave and the negative voltage —Es' appearing across diode 41 will be of greater magnitude (negative) than the synchronization voltage. The voltage of the common connection between the two diodes will, therefore, be shifted in a negative direction as indicated by Eo' of Fig. 3. It is noted that Eo' is negative with respect to the direct current axis of the sawtooth wave which is the direct current appearing at the common connection between the diodes when the oscillator is in synchronization with the pulses. Accordingly, as the frequency of the oscillator is too slow, the potential at the center point of the diode will become more negative and this voltage will be applied to the reactance tube to cause the frequency of the oscillator to be increased as previously described. It is obvious that if the speed of the oscillator is too fast, the potential across the positive diode 42 will be greater than that across the negative diode 41 and the voltage at the center point will be more positive. This change will be applied through the reactance tube to decrease the speed of the oscillator.

Figure 4:
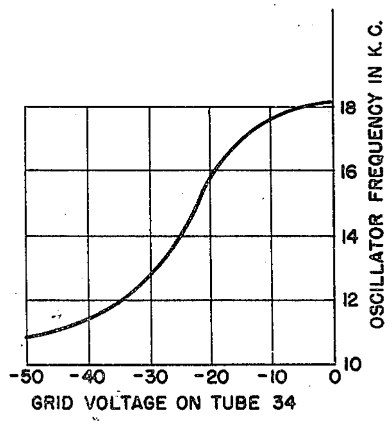
Fig. 4 is a curve showing the operating characteristics of the frequency control system.

The control of the oscillator through the reactance tube holds the oscillator in step with the synchronization pulses but will not cause a sudden change in frequency of the oscillator due to irregularities of the pulse rate as the circuit controls the speed of the oscillator in accordance with the average speed of the pulses over a short interval rather than in accordance with each synchronization pulse. Accordingly, distortion or tearing of the television picture which results from irreqularities of the pulse rate when the scanning generator is positively locked to the synchronization pulses is avoided and still the oscillator remains synchronized with the horizontal synchronization pulses. In Fig. 4 is shown the change of frequency for various voltages applied to the grid of the reactance tube 34. The wide range of control shown is not necessary as scanning oscillators are designed to have a frequency very nearly equal to the synchronization frequency. In actual operation a control voltage of one-half volt will normally be sufficient to keep the oscillator in step, with a maximum voltage of five volts being sufficient in any condition which would arise. These values, of course, depend upon the inherent stability of the oscillator used. Changing the frequency of the scanning oscillator will also result in change of the picture size. As the speed of the oscillator is increased, the amplitude of each sawtooth wave will be less and accordingly the scanning beam will not be deflected as great a distance. As the change in frequency will be very slight in actual operation, the change in the picture size will not be detected.

Figure 5:
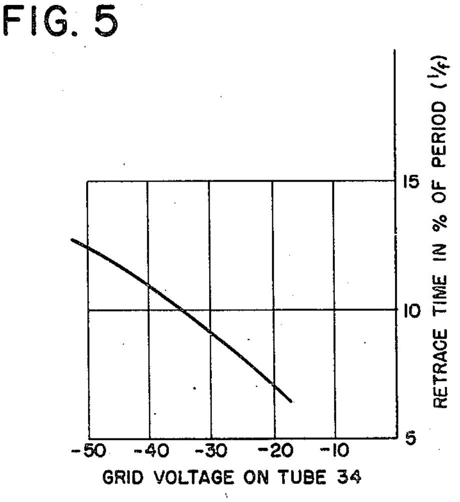
Fig. 5 is a curve illustrating the reduction of retrace time obtained by using the control system of this invention.

It has further been found that the reduction of the effective inductance of the transformer by the reactance tube which shunts the windings of the transformer is effective to reduce the period of the free oscillation which results at the end of each sawtooth current wave. Since this free oscillation produces the retrace in the scanning system, the retrace time will, therefore, be decreased. Fig. 5 shows the reduction of retrace time as a function of the grid bias applied to the reactance tube. This curve is the result of actual tests made in which the frequency of the oscillator was held constant and the inductance of the reactance tube varied by changing the grid bias thereon.

It is to be noted that although Figs. 4 and 5 indicate the frequency of the oscillator and the retrace time plotted against the same values of grid bias, the frequency and retrace time need not be correlated in the manner shown by these two figures as both characteristics are also dependent upon factors. For example, the frequency can be controlled by the variable resistance 78 in the grid circuit of oscillator 35 which would shift the coordinates of Fig. 4 so that the grid bias would correspond to different frequencies.

It is, therefore, seen that a control circuit is provided for a sawtooth generator to be used in a television receiving system in which the frequency of the oscillator is not positively locked to the synchronization pulses but has the same average frequency as the pulses to hold the oscillator in step therewith without producing sudden changes in frequency which would cause distortion of the picture. The control circuit also is effective to control the retrace time of the scanning beam.

Although I have described what I consider to be the preferred embodiment of my invention, it is obvious that various modifications and changes can be made therein which fall within the intended scope of the invention as defined by the appended claims.

I claim:

1. In a television system including in combination, means for producing an electron beam and deflecting coils therefor, a generator for supplying current of sawtooth wave form to said deflecting coils, said generator having a frequency controlling circuit, a reactance tube coupled to said frequency controlling circuit for reducing the effective inductance thereof, means for deriving synchronization pulses, and control means for applying a voltage to said reactance tube which increases as the frequency of said generator increases with respect to the frequency of said synchronization pulses to increase the inductance reducing effect of said reactance tube on said frequency control circuit, to cause the frequency of said generator to decrease.

2. In a television system including a scanning beam, deflecting coils for producing a magnetic field to move said beam across a screen, a generator for supplying current of sawtooth wave form to said deflecting coils to move said beam across said screen in one direction at a constant speed and then cause said beam to retrace said screen in the opposite direction at very high speed, and means for deriving synchronization pulses; the combination including, a control system for said generator for controlling the frequency and wave form of the current supplied thereby, comprising reactance means having a variable reactive impedance depending upon the voltage applied thereto, said reactance means being coupled to said generator to reduce the effective inductance of the output circuit thereof for controlling the frequency of said generator and for changing the wave form of the current supplied thereby to reduce the time required for said beam to retrace said screen, means for deriving a voltage varying in accordance with the deviation of the frequency of said generator from the frequency of said synchronization pulses and means for applying said voltage to said reactance means in the correct sense to control the inductance reducing effect of said reactance means so that the frequency of said generator is changed to eliminate said deviation.

3. In a television system which includes a sawtooth generator having an inductance element in the frequency controlling circuit thereof, a control system for holding said generator in step with synchronization pulses including in combination, rectifying means for producing a voltage varying in accordance with the deviation of the frequency of said generator from the frequency of said synchronization pulses, reactive impedance means having a variable impedance depending upon the voltage applied thereto, means for bridging said reactive impedance means across said inductance element of said generator for reducing the effective inductance thereof, and means for applying the voltage from said rectifying means to said reactive impedance means to change the impedance thereof and vary the inductance reducing effect thereof on said inductance element, to thereby alter the frequency of said generator in the correct sense to eliminate the deviation thereof from the frequency of said synchronization pulses.

4. A current generator adapted to produce a sawtooth current wave in which the current increases at a constant rate and then drops very rapidly, said generator including in combination, a reactance tube in the frequency control circuit thereof for reducing the effective inductance thereof, means for applying a voltage to said reactance tube which varies in accordance with the deviation of the frequency of said oscillator from the frequency of a control signal to change the impedance of said reactance tube and thereby changing the inductance of said frequency controlling circuit so that the frequency of said generator changes in a sense to eliminate said deviation, said reduced inductance of said frequency controlling circuit being effective to increase the rate at which the current of said generator drops.

5. A sawtooth current generator including in combination, a thermionic tube having plate and grid circuits, a transformer for coupling said circuits and having a plurality of windings, with the frequency of said generator and the shape of the current wave produced thereby depending upon the effective inductance of said transformer windings, variable reactance means bridged across at least one of said windings of said transformer and reducing the inductance of said transformer by an amount depending upon the voltage applied to said reactance means, means for producing a voltage depending upon the deviation of said generator frequency from a control frequency and for applying said voltage to said reactance means for changing the effective inductance of said transformer.

6. A sawtooth current generator having means for controlling the frequency thereof in accordance with synchronization pulses, comprising a thermionic tube having plate and grid circuits, a transformer coupling said plate and grid circuits, a reactance tube bridge across at least a portion of said transformer and reducing the effective inductance of said transformer so that the sawtooth wave produced by said generator has steep retrace portions, said reactance tube providing a variable effective inductance depending upon the voltage applied to said reactance tube, diode rectifying means for producing a voltage varying with the deviation of said generator frequency from the frequency of said synchronization pulses, and means for applying said voltage to said reactance tube for controlling the amount of reduction of the effective inductance of said transformer and thereby varying the frequency of said generator to eliminate said deviation.

7. A control system for an oscillator which includes a frequency controlling circuit, for holding the oscillator in step with synchronization pulses including in combination, discriminator means for producing a voltage which varies with the deviation of the frequency of said oscillator from the freqecny of said synchronization pulses, a reactance tube circuit connected to said frequency controlling circuit for reducing the inductance thereof by an amount varying in accordance with the amplitude of a negative voltage applied thereto, means for converting the voltage from said discriminator means into a negative voltage, varying from a maximum value when the frequency of said oscillator is greater than the frequency of said synchronization pulses to a minimum value when the frequency of said oscillator is less than the frequency of said synchronization pulses, and means for applying said negative voltage to said reactance tube circuit for controlling the effect thereof on said frequency controlling circuit to change the frequency of said generator to thereby hold said generator in step with said synchronization pulses.

8. A control system for a generator which produces a sawtooth current wave and which includes a frequency controlling circuit, said control system holding the generator in step with synchronization pulses and including in combination, discriminator means for producing a voltage which varies from positive values when the generator runs faster than the rate of occurrence of said synchronization pulses to negative values when the generator runs slower than the rate of ocurrence of said synchronization pulses, a reactance tube circuit connected to said frequency controlling circuit for reducing the inductance thereof, with the amount of reduction varying in accordance with the amplitude of a negative voltage applied thereto, means for amplifying the voltage from said discriminator means, voltage regulator means for converting the amplified voltage into a negative voltage of greater amplitude varying directly with the frequency of said generator with respect to the rate of occurrence of said synchrnoization pulses, and means for applying said negative voltage to said reactance tube circuit for controlling the effect thereof on said frequency controlling circuit to change the frequency of said oscillator to eliminate the deviation thereof from the frequency of said synchronization pulses.

ROBERT R. ENGLISH.

REFERENCES CITED

The following references are of record in the file of this patent:

UNITED STATES PATENTS

| Number | Name | Date |
|---|---|---|
| 2,209,507 | Campbell | July 30, 1940 |
| 2,339,536 | Wendt | Jan. 18, 1944 |
| 2,358,545 | Wendt | Sept. 19, 1944 |
| 2,284,378 | Dome | May 26, 1942 |
| 2,302,161 | Woerner | Nov. 17, 1942 |
| 2,352,541 | Harper | June 27, 1944 |